US011142363B2

(12) United States Patent
Vicktorius et al.

(10) Patent No.: US 11,142,363 B2
(45) Date of Patent: Oct. 12, 2021

(54) DEVICE AND METHOD FOR LABELING INDIVIDUAL PACKAGES

(71) Applicant: ESPERA-WERKE GmbH, Duisburg (DE)

(72) Inventors: Winfried Vicktorius, Duisburg (DE); Ulrich Jung, Dortmund (DE)

(73) Assignee: Espera-Werke GmbH, Duisburg (DE)

( * ) Notice: Subject to any disclaimer, the term of this patent is extended or adjusted under 35 U.S.C. 154(b) by 280 days.

(21) Appl. No.: 15/767,749

(22) PCT Filed: Jun. 27, 2016

(86) PCT No.: PCT/EP2016/064774
§ 371 (c)(1),
(2) Date: Apr. 12, 2018

(87) PCT Pub. No.: WO2017/063765
PCT Pub. Date: Apr. 20, 2017

(65) Prior Publication Data

US 2018/0305061 A1 Oct. 25, 2018

(30) Foreign Application Priority Data

Oct. 15, 2015 (DE) ..................... 10 2015 117 533.9

(51) Int. Cl.
*B32B 41/00* (2006.01)
*B65C 9/18* (2006.01)
(Continued)

(52) U.S. Cl.
CPC .............. *B65C 9/1884* (2013.01); *B65C 9/28* (2013.01); *B65C 9/36* (2013.01); *B65C 9/46* (2013.01);
(Continued)

(58) Field of Classification Search
CPC ........... B65C 9/1884; B65C 9/46; B65C 9/36; B65C 9/28; B65C 2009/401; B65C 2009/0053
(Continued)

(56) References Cited

U.S. PATENT DOCUMENTS 3,951,061 A * 4/1976 Bremmer, Jr. ............. B41J 1/32
101/93.12
2005/0263535 A1 12/2005 Smith

FOREIGN PATENT DOCUMENTS

DE 29519702 U1 2/1996
DE 19727648 A1 1/1999
(Continued)

*Primary Examiner* — Michael N Orlando
*Assistant Examiner* — Joshel Rivera
(74) *Attorney, Agent, or Firm* — Rankin, Hill & Clark LLP

(57) ABSTRACT

An apparatus for labeling a package (1) including an advancing device (2) for transporting the package in a transport direction (X) and an application device (3) for applying a dispensed label (4) to the package. The application device includes an oscillating punch (7) having a punch stem (5) and a punch foot (6) connected thereto. The dispensed label is picked up by the punch foot from a pickup position, moved to a deposit position, and applied by the punch foot to the package. The punch stem is movably mounted on a guide element (8), held in a direction of gravitational force (Y) by a holder (9), and mounted pivotably about a horizontal pivot axis (X1) that runs orthogonal to the direction of gravitational force. The guide element carries at least one component of the holder and is pivotable about the pivot axis. Also a labeling method that utilizes the apparatus.

29 Claims, 7 Drawing Sheets

Figure 1A:
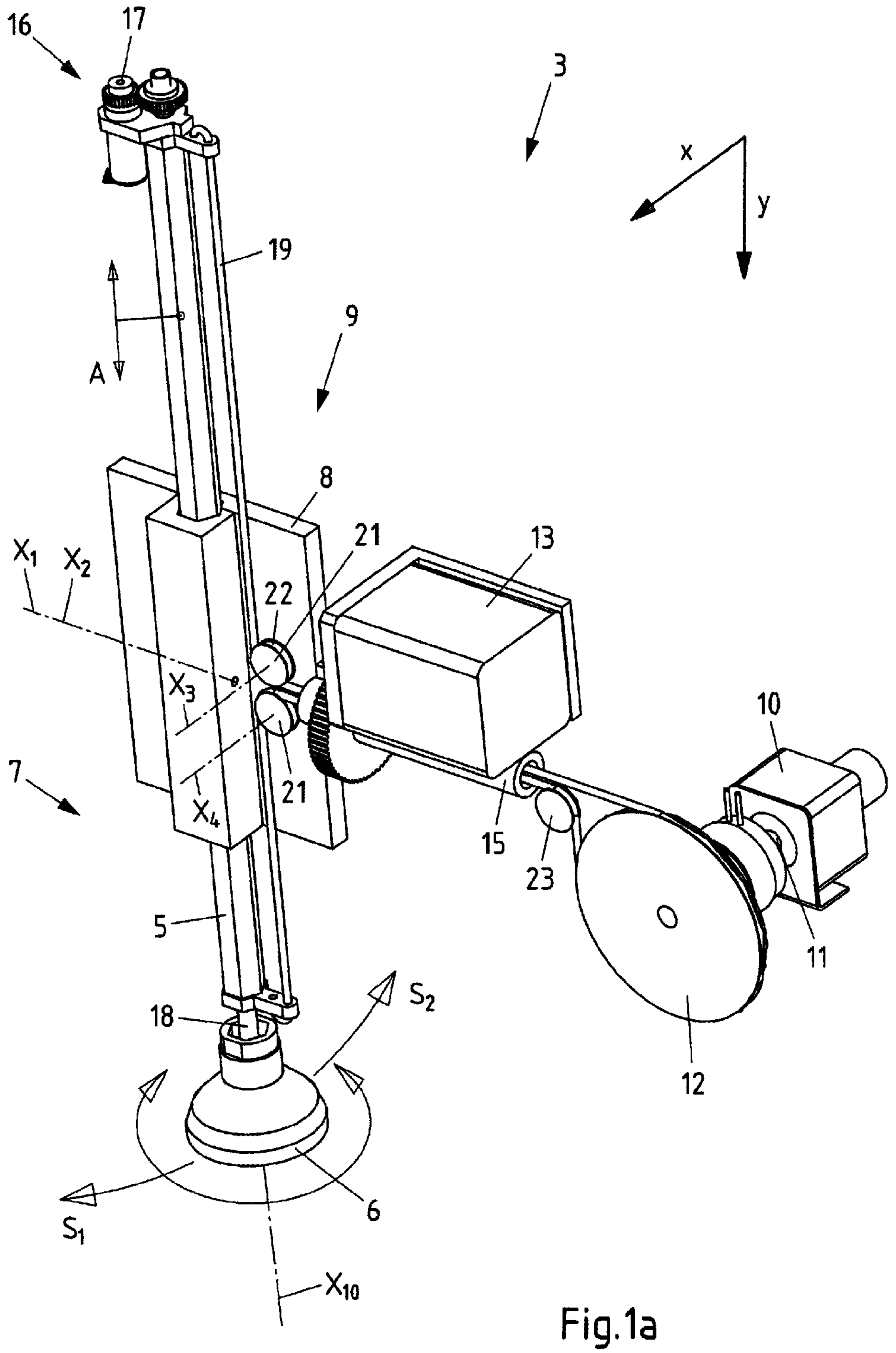
Figure 1B:
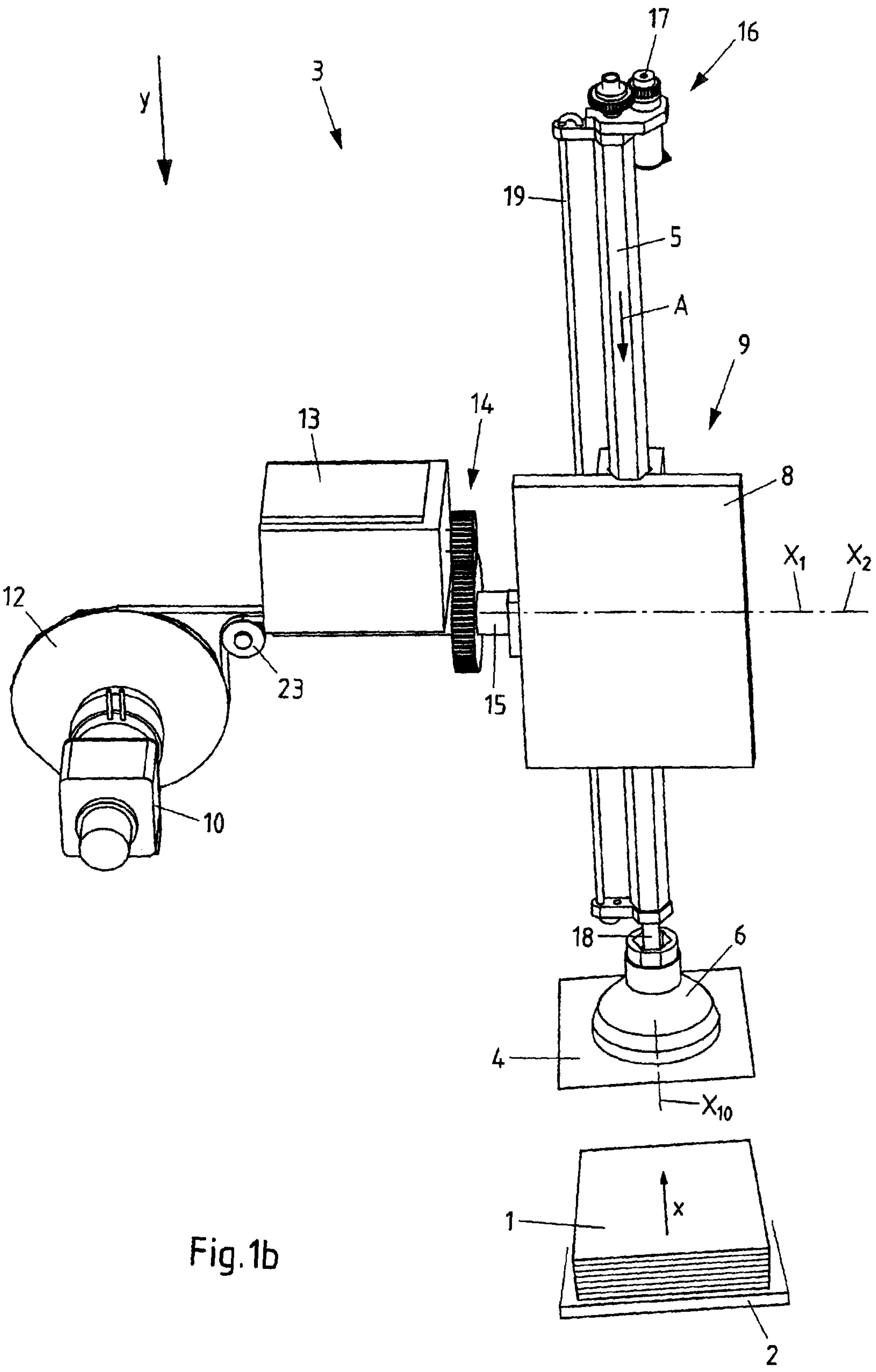

(51) Int. Cl.

| | |
|---|---|
| ***B65C 9/28*** | (2006.01) |
| ***B65C 9/36*** | (2006.01) |
| ***B65C 9/46*** | (2006.01) |
| *B65C 9/00* | (2006.01) |
| *B65C 9/40* | (2006.01) |

(52) U.S. Cl.
CPC ................. *B65C 2009/0053* (2013.01); *B65C 2009/401* (2013.01)

(58) Field of Classification Search
USPC .................... 156/60, 64, 350, 351, 378, 379
See application file for complete search history.

(56) References Cited

FOREIGN PATENT DOCUMENTS

| | | | |
|---|---|---|---|
| DE | 102004041381 | A1 | 7/2005 |
| EP | 0090631 | A2 | 10/1983 |

* cited by examiner

DEVICE AND METHOD FOR LABELING INDIVIDUAL PACKAGES

The present invention relates to an apparatus for labeling individual packages, with an advancing device for transporting the respective package in a transport direction, with an application device for applying a dispensed label to the respective package, wherein the application device has an oscillating punch, which has a punch stem and a punch foot connected thereto, for moving the dispensed label from a pickup position, in which the label is picked up by the punch foot, to a deposit position, in which the label can be applied by the punch foot to the respective package, wherein the application device furthermore has a guide element, on which the punch stem is movably mounted, and a holder, by which the punch stem is held in the direction of gravitational force, and wherein the punch stem is mounted pivotably about a horizontal pivot axis running orthogonally with respect to the direction of gravitational force.

Furthermore, the invention relates to a method for labeling individual packages using such an apparatus.

A corresponding apparatus and a corresponding method are known, for example, from DE 197 27 648 A1. The known apparatus has an advancing device in the form of a plurality of transport belts arranged one behind another in the transport direction, wherein a gap is provided between two adjacent transport belts. A package which, for example, contains merchandise, is transported on the transport belts in the transport direction which runs horizontally and is furthermore also referred to as the X direction. The direction of gravitational force runs orthogonally with respect thereto and is furthermore also referred to as the Y direction. As soon as the package is then located vertically above the gap, that is to say in the direction of gravitational force, a previously printed and dispensed label is applied from below through the gap onto the lower side of the package.

The labels to be applied to the individual packages are first of all releasably applied on a material strip in the form of a carrier strip provided in the form of a rolled product. The rolled product together with the labels is unwound in a dispensing device for dispensing a label and repeatedly deflected, finally at a dispensing edge formed by a plate about which the material strip runs. By means of the deflection at the dispensing edge, the label to be applied in each case is detached from the material strip and is picked up by a suction foot, which is arranged at the vertically upper end of a punch stem—a punch stem within the context of the invention means a tube or a rod which has to carry out axial movements for the purpose of picking up a label in the pickup position—by a negative pressure being produced in the suction foot. A corresponding dispensing device can also be provided according to the invention with the same manner of operation.

The punch stem which is connected to the suction foot is arranged in an axially movable manner in a guide tube. The punch stem can only be moved slightly axially within the guide tube. It can carry out what are referred to as short strokes in order to pick up a label at the dispensing edge from the material strip via the suction foot connected to the punch stem.

After the suction foot has picked up the label and the punch stem has been moved back again somewhat in the axial direction from the plate and the material strip, the guide tube is pivoted about a pivot axis, which runs transversely with respect to the transport direction, from the dispensing edge into the region below the gap between the two transport belts. For this purpose, the guide tube is fastened pivotably and axially movably in a guide element which is connected to an actuating device which carries out alternating horizontal movements and brings about the pivoting movements of the guide tube. As soon as the suction foot is located below said gap, the entire guide tube is moved in a direction substantially perpendicular to the transport direction in the direction of the gap, and therefore the suction foot with the label adhering thereto is guided through the gap as far as the lower side of the package. During this movement of the guide tube, no axial movement of the punch stem and suction foot relative to the guide tube takes place. The latter axial relative movements serve exclusively for picking up the label at the dispensing position.

As soon as the label has been transferred from the suction foot onto the lower side of the package, the guide tube is moved back again substantially perpendicularly to the transport belt and pivoted back again into the starting position in order to enable the suction foot to pick up a new label at the dispensing edge. At this point, said short stroke movement of the punch stem relative to the guide tube is then again carried out in order to pick up the new label from the material strip.

The previously described apparatus and the previously described method are relatively complicated, which is due to the fact, inter alia, that both a guide tube together with a holder of the guide tube and a punch stem, which is mounted within the guide tube, with the punch foot in each case have to be movable axially, and the guide tube has to be mounted pivotably about a pivot axis running outside the guide element and lying within the axial extension (projection). By means of the many necessary individual movements (axial movements of the guide tube together with the holder thereof and the punch stem and punch foot relative to the guide element, axial movements of the punch stem together with the punch foot relative to the guide tube, pivoting movements of the guide tube together with the punch stem, the punch foot and the guide element), not only is the complexity of the apparatus and of the method increased, but the labeling operation also requires a relatively large amount of time.

It is therefore an object of the present invention to specify a simplified apparatus and a corresponding method.

The previously derived and presented object is achieved, according to a first teaching of the present invention, in the case of an apparatus for labeling individual packages,

- with an advancing device for transporting the respective package in a transport direction,
- with an application device for applying a dispensed label to the respective package,
- wherein the application device has an oscillating punch, which has a punch stem and a punch foot connected thereto, for moving the dispensed label from a pickup position, in which the label is picked up by the punch foot (in particular blowing head and/or suction head), to a deposit position, in which the label can be applied by the punch foot to the respective package,
- wherein the application device furthermore has a guide element, on which the punch stem is movably mounted, in particular is mounted movably in a translatory manner (axially, i.e. in and counter to an axial direction) and/or in a rotatory manner (rotatably), and a holder, by which the punch stem is held in the direction of gravitational force, and wherein the punch stem is mounted pivotably about a horizontal pivot axis running orthogonally with respect to the direction of gravitational force and in particular orthogonally with respect to the transport direction, in that the guide element carries at least one of a plurality of components of the holder and is pivotable about the pivot axis. In other words, one or more components of the holder, e.g., inter alia, a drive wheel which is connected to the at least one drive motor, the at least one first drive motor, deflecting pulleys, multi-purpose shafts (parallel shafts), a connecting rod, etc., are mechanically connected to the guide element, that is to say fastened thereto.

The pivoting movement is an oscillating movement of the guide element on a carrier on which the guide element is mounted (fastened), wherein the pivoting movement initially takes place in a first pivoting direction and then in a second (opposed) pivoting direction relative to the advancing device and in particular about an axis orthogonal with respect to the direction of gravitational force and optionally also transport direction.

The carrier to which the fastening element is fastened is in particular part of a labeler which is preferably movable in a translatory manner in a direction orthogonally with respect to the direction of gravitational force and in particular orthogonally with respect to the transport direction. In the latter case, the carrier and the guide element which is connected thereto are therefore also movable in a translatory manner relative to the advancing device.

A holder means all of the components or a holder consists of all of the components which are required in order (without additional aids) to hold (to fix) the punch stem in every position of the punch stem in the direction of gravitational force relative to the guide element. The components which form the holder are, for example, at least one or more of the components enumerated below: one or more first drive motors, one or more drive wheels (in particular connected via the motor shaft to the at least one first drive motor), deflecting pulleys, multi-purpose shafts (parallel shafts), or one or more connecting rods. The components which are preferably carried by the guide element are in particular one or more of the deflecting pulleys and/or the multi-purpose shafts and/or one of the connecting rods and/or optionally the at least one first drive motor.

According to the invention, the guide element therefore carries at least part of the holder of the punch stem, i.e. a part of the unit of components which fix the punch stem in its position. In principle, it is also conceivable for all of the components which form the holder to be connected to the guide element, wherein said components would then, however, all have to be pivoted together with the guide element, which would cause relatively large forces and torques at the guide element. It is therefore preferred if only some of the components forming the holder are carried by the guide element. In particular, the components which, in the latter case, are not carried by the guide element are arranged immovably, that is to say positionally fixed, relative to the carrier or labeler and optionally also to the advancing device. In particular, it is provided that the guide element and the at least one component, which is carried thereby, of the holder, form a unit which is movable only in a rotatory manner, i.e. pivotably, and not in a translatory manner, i.e. linearly (is mounted movably) about the pivot axis relative to the carrier or labeler and optionally also to the advancing device. The pivot axis here in particular passes through the guide element or lies laterally next thereto, wherein, in the latter case, when the guide element lies laterally next thereto, the pivot axis does not pass through the punch stem or through the axial extension (projection) thereof.

The guide element itself if the carrying function of the components of the holder is not also taken into consideration solely has the function of guiding the punch stem, in particular of laterally guiding the punch stem during the axial movements thereof. The guide element can be of substantially plate-like or sleeve-shaped design and, in particular laterally or in the interior, can have ball bearings, in particular grooved ball bearings, in which the punch stem runs. In particular, the punch stem is designed at least in sections as a hexagonal rod (rod with a 6-cornered cross section) and is in each case guided by three ball bearings in a first plane orthogonal with respect to the axial direction and preferably in a second plane which is parallel thereto. The ball bearings are each arranged at 120° distances about the punch stem. It is alternatively also conceivable for the punch stem to in each case have a groove and/or a bead on the outside on two opposite sides, wherein the respective ball bearing grips in the respective groove or around the respective bead, and wherein preferably, on one of the sides of the punch stem, at least two ball bearings are arranged or are in engagement with the punch stem and, on the other side, at least one ball bearing is arranged or is in engagement with the punch stem. The individual or at least one of the ball bearings is in particular acted upon with a spring force which presses the ball bearing against the punch stem such that the latter always sits tautly between the bearings.

The design according to the invention of the labeling apparatus has the advantage over the prior art discussed at the beginning that the holder of the punch stem itself does not also have to undertake any translatory movements (linear movements). The holder itself therefore does not have to be mounted in an axially movable manner, which considerably simplifies the overall design of the apparatus. A further advantage is that the element which is in particular mounted in an axially movable manner in the guide element, i.e., according to the invention, the punch stem, does not bear any additional weight apart from the dead weight, as a result of which the punch stem movement, in particular axial movement of the punch stem, can be carried out more precisely. As a result, the labeling operation can also be made more precise and accelerated.

Various refinements of the apparatus according to the invention that are also the subject matter of the dependent claims will now be described below.

According to one refinement of the apparatus, it is provided that the holder is configured to move the punch stem axially in the guide element, that is in said axial direction. In other words, components which together fix the punch stem in every position relative to the guide element are therefore at least partially also designed to move the punch stem axially. A separate device which is provided independently of the holder and which carries out the axial movement of the punch stem is therefore avoided. For the sake of completeness, it should be mentioned that, in addition or alternatively to its movability in the axial direction, the punch stem can also be mounted or articulated on the guide element in a rotatory manner and can correspondingly carry out a (further) pivoting movement. In the latter case, two pivoting movements would therefore then be combined, namely that of the guide element relative to the holder (relative to the labeler) and that of the punch stem relative to the guide element.

So that the holder can carry out axial movements, it is provided, according to a further refinement, that the holder comprises at least one first drive motor which in particular has a motor shaft. The at least one first drive motor is at least configured to bring about the axial movements (linear movements or translatory movements) of the punch stem. As is also explained below, the at least one first drive motor, in particular in the case of a drive with two such drive motors, can additionally, however, also be configured to offset the punch foot or a connecting shaft connected thereto for rotation therewith into rotation about an axis which runs parallel to or coaxially with respect to the longitudinal center axis of the punch stem. Such a rotation of the punch foot, with which the label can be rotated, for example, incrementally in 1° steps, may be desired in order to align the label differently again after being picked up in the pickup position.

According to yet another refinement of the apparatus, it is provided that the at least one first drive motor, in particular the motor shaft, is in each case connected to a, preferably rotatable, component of the holder, in particular connected for rotation therewith, which component is not carried by the guide element, wherein the component is in particular a drive wheel which is preferably connected to the motor shaft for rotation therewith.

According to yet another refinement of the apparatus according to the invention, it is provided that the guide element is coupled to a second drive motor which in particular has a motor shaft. Said drive motor is configured in particular for the pivoting movements (oscillating movements) of the punch stem.

Within the context of the invention, coupled means that the two connection partners (the components which are coupled to each other) are connected to each other either for rotation therewith or via a geared connection, for example a gear wheel and belt connection, or a clutch, for example in the form of an electromagnetic clutch, a mechanical slip clutch or via disks which are rotatable in relation to each other and are coupled to springs in terms of torque.

A clutch is provided in particular between the at least one first drive motor, which brings about the axial movement, and the punch stem, in particular between the motor shaft and the drive wheel of the at least one first drive motor. Too hard an impact of the punch stem against the package is therefore prevented, and this at the same time prevents an operator from being injured by the punch stem. With the aid of a mechanical slip clutch, a preset force cannot be exceeded. A hard rise in force can be avoided by disks coupled to springs. In addition, if the distance as far as striking against the package is known, a targeted contact pressure force can be achieved by means of a precalculated travel allowance. However, an adjustable clutch, in particular an electromagnetic clutch, is preferred. The adjustable or electromagnetic clutch makes it possible for the package to be approached at high speed, for braking to take place prior to the impact and, only at the moment of application of the label when, depending on the timing, the punch stem is already waiting without movement for the package, to reduce the magnetic force and to carry out the residual stroke in this state. The press-on force can be adjusted here very precisely by activation of the clutch, and therefore the customer can select press-on forces from soft to hard. Furthermore, said force would be independent of the travel. This means that, if the height of the package is not precisely known, the punch stem can be moved further and, although there is already contact with the package, the press-on force would not rise or not rise significantly and would therefore nevertheless treat the product with care.

The value for the press-on force can be stored by the customer in the software for activating the labeling system. In an optimum manner, this value is stored in a database as a possible attribute of product properties, e.g. length, width and height of the package, and is therefore also known to the controller when the package is retrieved. In principle, it is also conceivable to use the counter EMF of an electric motor in order to recognize whether the punch is impacting somewhere.

A rotary transducer is preferably located on the output side of the clutch to the linear punch stem drive. It is therefore possible for the punch stem to approach the package precisely in terms of travel and precisely in terms of time, but also to recognize the impact of the punch stem on the package or on an unexpected obstacle. The machine controller follows the package preferably via sensors, for example light barriers, and can therefore calculate when the package on the conveyor belt is reaching the labeling point. If the height of the package deviates from the height of the package preset by the customer, it can be recognized with the aid of the rotary transducer whether the package has been reached at the expected time. If the package has not yet been reached, the punch stem can be moved further than previously calculated in order nevertheless to deposit the label at the preset force. If it has been reached sooner, the reverse movement can be initiated sooner and therefore damage to the product can be minimized. Not least, the punch axis can, as it were, itself recognize the height of the package, and this can be used in the case of correspondingly robust packages in order not to input the height of the package particularly precisely or even at all, as a result of which the maintenance cost of the database would be reduced.

According to yet another refinement, it is provided that the second drive motor, in particular the motor shaft, is coupled to a first connecting shaft, which is connected to the connecting element for rotation therewith, and in particular drives the first connecting shaft. The first connecting shaft is designed in particular as a hollow shaft. The hollow shaft is preferably of two-part design in order also to use a clutch here. As in the case of the clutch for the linear punch stem drive, said clutch may also be replaced by a preadjustable slip clutch or by disks coupled to springs in terms of torque. Here too, the electromagnetically actuated clutch has the optimum range of functions. This makes it possible to apply a sufficiently large holding torque for the relatively strongly accelerated oscillating movement, and, when required, preferably to reduce the stress and the carrying-along force by reducing the electrical activation parameters. The clutch is expedient in order not to allow too high a reaction force in the event of inadvertent contact with the package or else with the operator. As a result, the package, the oscillating punch stem and the drive are protected from overload and the operator is protected from injuries.

In the ideal case, yet another advantage arises. A possibly present rotary transducer on the output side of the oscillation axis, like the rotary transducer on the output side of the linear axis, makes it possible to register a deviation from the desired travel of the oscillating movement. This can be used in order to recognize an unexpected contact, as described above. It is then possible to switch off the clutch and/or the drive motor in order no longer to have any driving force acting in the oscillating direction. If the unexpected contact occurs due to too great a height of the package, the controller can undertake an oscillating movement in the transport direction of the package and can pull back the punch stem without damaging the package and the labeling system, and the following product can be labeled without further interruption again.

According to yet another refinement, it is provided that the punch foot is coupled to a third drive motor which in particular has a motor shaft. The third drive motor is configured in particular to bring about the already previously mentioned rotational movement of the punch foot. The drive motor itself is preferably a stepper motor, as is used, for example, in office printers, which acts on the connecting shaft via a compact angular gearing, for example worm gear.

According to yet another refinement, it is provided that the third drive motor, in particular the motor shaft, is coupled to a second connecting shaft, which is connected to the punch foot for rotation therewith, and in particular drives the second connecting shaft. The second connecting shaft in particular runs here within the punch stem and is rotatable with respect thereto, wherein the second connecting shaft is in particular not movable in a translatory manner within the punch stem. For weight reasons, the second connecting shaft is composed in particular of carbon fiber. For weight reasons, individual moving components or all of the remaining moving components can also be manufactured from plastic, in particular even the punch stem and/or the guide element.

The punch foot can be designed as a suction head, which means that the punch foot can exert a suction force on the label and can thereby suck up and securely transport said label. In addition, the punch foot can be designed as a blowing head, which means that the punch foot can exert a blast of compressed air (blowing pulse) on the label in order to apply the latter contactlessly to the package. If the suction head is used with a blow-off function, said suction head always has to be placed as centrally in terms of surface as possible above the label. For this purpose, the three axes driven by the respective drive motor can be fastened with their support structures to a common carrier, in particular a carrier as previously defined, and the latter can be moved either manually or automatically transversely with respect to the transport direction of the labels. In the case of the automatic movement, the travel required for this purpose can be stored in a label database. In addition, the punch foot is provided in particular with a rapid change function. It is therefore possible very rapidly to use different sizes of punch feet and thus to select the foot which is as optimum as possible for the selected size of label. In order to be able to obtain as optimum a transfer as possible of the label from the dispensing edge to the punch foot, suction runners can be provided directly on the left and right next to the punch foot. The smaller the distance between runners and punch foot, the less the label bends and therefore the more rapidly the label can be sucked up by the suction foot. Since the changing of a punch foot requires a readjustment of the runners, the latter are preferably movable manually or automatically on an axis which is adjustable symmetrically with respect to the punch foot. In the case of the automatic movement, the travel required for this purpose can again be stored in the label database.

Some refinements of the apparatus which can be realized in particular in the case of an apparatus provided with a cable drive and/or toothed belt drive are now described below:

According to a further refinement of the apparatus, it is provided that the holder has a cable or a belt which is connected with a first portion, in particular end portion (of the cable or belt), to an upper portion of the punch stem that, in each position of the punch stem relative to the guide element, is arranged vertically above the guide element, and is connected with a second portion, in particular end portion (of the cable or belt), to a lower portion of the punch stem that, in each position of the punch stem relative to the guide element, is arranged vertically below the guide element. The cable or the belt firstly holds the punch stem and secondly serves to move the latter to and fro parallel to the axial direction.

According to yet another refinement of the apparatus, it is provided that the guide element carries at least two components of the holder in the form of deflecting pulleys which in particular have a circumferentially encircling groove, wherein the cable or the belt, starting from the first or second portion thereof, is first of all deflected on one of the deflecting pulleys (in the direction of the longitudinal extent thereof), then is guided circumferentially about the drive wheel driven by the first drive motor and, over the further course, is deflected on a further of the deflecting pulleys. The deflecting pulleys have the advantage that the two cable portions which start from the drive wheel, which is connected to the first drive motor, can be arranged as close as possible next to each other and at as small a distance as possible from each other and in particular can be guided parallel to each other, as a result of which the two cable portions can be guided by the first connecting shaft, which is then a hollow shaft. The first connecting shaft is connected to the guide element in particular for rotation therewith, and the pivot axis of guide element and punch stem preferably runs coaxially with respect to the longitudinal axis of the connecting shaft. It is true that a slight twisting of the cable or belt may occur within the deflecting pulleys during the oscillating movement. However, since the oscillating movement generally takes place only within an angular range of overall a maximum of 45°, preferably a maximum of 35°, particularly preferably a maximum of 30°, this effect is negligible, in particular if a circumferential groove is located in one or more of the deflecting pulleys.

According again to a further refinement, it is provided that the cable or the belt in a region (space portion) between the drive wheel, which is driven by the first drive motor, and the guide element is deflected on a further deflecting pulley, which is not carried by the guide element, and/or is guided by the first connecting shaft, which is designed as a hollow shaft. As stated, the pivot axis in particular runs centrally through the hollow shaft.

According to yet another refinement, it is provided that the axis of rotation of the first connecting shaft runs orthogonally with respect to the axes of rotation of the two deflecting pulleys carried by the guide element, and in particular runs centrally between the two deflecting pulleys and preferably centrally between the encircling grooves of the deflecting pulleys.

According to yet another refinement of the apparatus according to the invention, it is provided that the at least one first and/or the second drive motor are/is immovable (positionally fixed) relative to the carrier or labeler and/or relative to the advancing device. It can also be provided that the at least one first drive motor is connected directly or indirectly to the guide element and is mounted immovably relative thereto, i.e. therefore in particular pivots at the same time. It can also be provided that the third drive motor is directly or indirectly connected to the punch stem and is mounted immovably relative thereto, and thereby in particular pivots at the same time and moves linearly at the same time.

According to yet another refinement of the apparatus according to the invention, it is provided that the belt is a toothed belt, and the drive wheel, which is driven by the first drive motor, and/or the deflecting pulleys are each formed by a gear wheel.

Some refinements of the apparatus which can be realized in particular in the case of an apparatus provided with parallel shafts and a toothed belt drive will now be described below:

According to a further refinement of the apparatus according to the invention, it is provided that the guide element carries at least two components of the holder in the form of two parallel multi-purpose shafts which are both connected rotatably to the guide element, wherein the holder furthermore has two first drive motors, wherein each of the two multi-purpose shafts is in each case driven by one of the two drive motors. In this case, it is not simply a first drive motor which is provided, but two first drive motors, via which, in this case, not only can the axial movement of the punch stem within the guide element and relative to the advancing device be realized, but additionally, as an option, so too can the rotational movement of the punch foot or of the connecting shaft which is connected thereto for rotation therewith and in particular runs in the interior of the punch stem.

According to yet another refinement of the apparatus, it is provided that the multi-purpose shafts each have a drive wheel which is connected thereto for rotation therewith, and a deflecting pulley is in each case arranged on an upper portion of the punch stem that, in each position of the punch stem relative to the guide element, is arranged vertically above the guide element, and on a lower portion of the punch stem that, in each position of the punch stem relative to the guide element, is arranged vertically below the guide element, wherein the axes of rotation of the two drive wheels and of the two deflecting pulleys run parallel to one another and orthogonally with respect to the axial direction of the punch stem, and wherein an endless belt is guided via the two drive wheels and the two deflecting pulleys. The multi-purpose shafts are both in particular fastened rotatably to the guide element and in particular pass through the guide element. It is conceivable here that the two first drive motors are arranged on the one side of the guide element, and the two drive wheels which are connected to the two multi-purpose shafts for rotation therewith are arranged on the other side of the guide element. In principle, however, the components can also be arranged on one and the same side of the guide element.

According to yet another refinement of the apparatus according to the invention, it is provided that the upper and/or lower deflecting pulley is coupled to the second connecting shaft and in particular drives the second connecting shaft. The deflecting pulley coupled to the second connecting shaft is preferably arranged at the upper end of the punch stem and/or is coupled to the second connecting shaft via a gearing or a gear wheel connection.

According to yet another refinement of the apparatus according to the invention, it is provided that the endless belt connects the drive wheels and the deflecting pulleys to one another in such a manner that an opposed rotational movement of the two drive wheels brings about the translatory movement (linear movement) of the punch stem in the axial direction (relative to the guide element) and a parallel rotational movement of the two drive wheels brings about the rotational movement of the second connecting shaft and of the punch foot which is connected thereto for rotation therewith. In this manner, the two first drive motors form a drive which takes on the function of a first and third drive motor, as previously described. A separate third drive motor for bringing about the rotation of the punch foot is not necessary.

According to another refinement of the apparatus according to the invention, it is provided that the two first drive motors are connected directly or indirectly to the guide element and are mounted immovably relative thereto, and/or the second drive motor is immovable relative to the carrier or labeler and/or relative to the advancing device.

According again to a further refinement of the apparatus according to the invention, it is provided that the endless belt is a toothed belt, and the drive wheels and the deflecting pulleys are each formed by a gear wheel.

Some refinements of the apparatus which can be realized in particular in the case of an apparatus provided with a toothed rack drive will now be described below:

According to another refinement of the apparatus according to the invention, it is provided that the punch stem is designed as a toothed rack. The toothing of the toothed rack is provided here in particular only on one side of the punch stem. In principle, as an alternative to a toothed rack, a threaded spindle would also be conceivable as the punch stem.

In particular, the at least one drive motor as drive wheel drives a gear wheel which is in engagement with the toothed rack or, in another embodiment, with a toothed belt. If the toothing on the punch stem is provided only on one side, the corresponding gear wheel also acts only on this side. On the rear side of the toothed rack that faces away from the toothing or on both sides of the toothed rack, said toothed rack can be held orthogonally with respect to the axial direction by ball bearings in the guide element.

According to a further refinement of the apparatus according to the invention, it is provided that the guide element carries at least one first connecting rod which is articulated thereon, and the second drive motor exerts an eccentric movement on a second connecting rod which is connected in an articulated manner to the first connecting rod. The eccentric movement can be brought about, for example, by the fact that the motor shaft is or drives a crankshaft. Such drives are also referred to as an eccentric motor or eccentric drive. By means of the eccentric movement, the second connecting rod is moved to and fro during operation of the motor, and this, as a result, is also transmitted via the first connecting rod, which is connected thereto, to the pivotably mounted guide element, as a result of which, finally, the oscillating movement (the pivoting movements) of guide element and punch stem guided therein is brought about. It is preferred here if the at least one first drive motor is immovable (positionally fixed) relative to the carrier, to which the guide element is fastened and which is in particular part of a labeler, and/or relative to the advancing device and/or relative to the guide element. Finally, according to yet another refinement of the apparatus according to the invention, it is provided that the guide element and/or the punch stem is pivotable about the drive axis of the at least one first drive motor, wherein the punch stem lies in particular constantly against the drive wheel of the at least one first drive motor.

It should be pointed out that the features and combinations of features described above may be combined with one another as desired. It is therefore basically conceivable for individual features of combinations of features which relate to the apparatus with the cable drive and/or belt drive also to be able to be realized in the case of the apparatus with the parallel shafts and the toothed belt drive or in the case of the apparatus with the toothed rack drive. The same also applies to the features which have been described in conjunction with the apparatus with the parallel shafts and the toothed belt drive and the features which have been described in conjunction with the apparatus with the toothed rack drive, and which can basically also each be used in the case of the other apparatuses in each case.

The previously derived and presented object is furthermore achieved, according to a second teaching of the present invention, in a method for labeling individual packages using an apparatus as previously defined, in that in order to apply the dispensed label, the punch foot is moved from the pickup position directly in a direction which runs at an angle to the transport direction, and after the label has been applied to the package in the deposit position, the punch foot is moved back to the pickup position, wherein, during the movement from the pickup position to the deposit position, the guide element together with the punch stem is pivoted about a pivot axis in a first pivoting direction, and the punch stem is moved relative to the guide element in a first movement direction, in particular in a translatory or rotatory manner, and, during the movement from the deposit position to the pickup position, the guide element together with the punch stem is pivoted about the pivot axis in a second pivoting direction and the punch stem is moved relative to the guide element counter to the first movement direction, in particular in a translatory or rotatory manner, in such a manner that the punch foot, during its entire movement from the pickup position via the deposit position and back again to the pickup position, is guided along a revolving path which does not come into contact or cross itself at any point and which is in particular substantially oval.

An exemplary sequence of a labeling operation using the apparatus according to the invention or the method according to the invention is then as follows: the label is dispensed by a printer in the transporting direction of the paper and separated from the carrier paper at a strip-off edge (dispensing edge). As an alternative thereto, it may also be a linerless label (endless labels with a self-adhesive layer on the unprinted side, which has been wound up in the manner of an adhesive tape, i.e. manages without carrier paper) which is then cut off by a cutting-off device after being dispensed.

So that the label is not dropped in an uncontrolled manner, it is held up in particular by one or two suction runners which can be assisted by a blowing nozzle arranged therebelow. This also makes it possible for the punch foot, which is designed here as a suction head and which sucks up the label, not yet to have to be positioned in the transfer position and, for example, still to be able to be located on the return path from the previous cycle.

After the label has been completely dispensed and the suction head is in the pickup position, said suction head sucks up the label. The negative pressure at the suction runners is switched off. In this state, a combined movement arises: pivoting movement away from the dispensing edge and vertical movement or second (combined) pivoting movement toward the package. In addition, rotation of the label can also be started.

The pivoting movement is preferably stopped when the punch stem is located vertically (in the direction of gravitational force) above the package. In order, however, to impact vertically against package surfaces standing obliquely, the pivoting movement may also be stopped in a different position. For the stopping of the pivoting movement, a brake, preferably an electromagnetic brake, is in particular provided which brakes the first connecting shaft, which is driven by the second drive motor and is connected to the guide element for rotation therewith.

However, the label can also be applied during the oscillating movement without the latter having to be stopped or interrupted for this purpose. For this purpose, the circumferential speed of the suction and blowing head has to be identical to the product transporting speed. In the case of a punch foot having a blow-off function, a blast of compressed air which brings the label from the suction surface onto the product takes place at the calculated time.

During use of the punch foot which requires contact with the package, a linear travel preferably still takes place, at the end of which there is contact with the product and then the negative pressure at the suction surface of the punch foot is switched off. Subsequently, the punch stem is moved upwards while simultaneously oscillating further. In the case of the suction head, the latter is in contact with the package for a brief time. In the case of packages which are labeled in the movement, the transverse forces on package and punch stem are reduced during the further oscillation. The punch stem subsequently has to move into the upper starting position.

The reverse oscillating movement takes place at the upper starting position, which is preferably located somewhat higher than the suction position in which the oscillating foot designed as the suction head sucks up the label for the first time, since the suction head now has to move above a label which has optionally already been dispensed. In order to bridge this distance, at the end of the movement cycle a small linear movement, which is directed in the axial direction of the punch stem, to the dispensed label follows.

Figure 2:
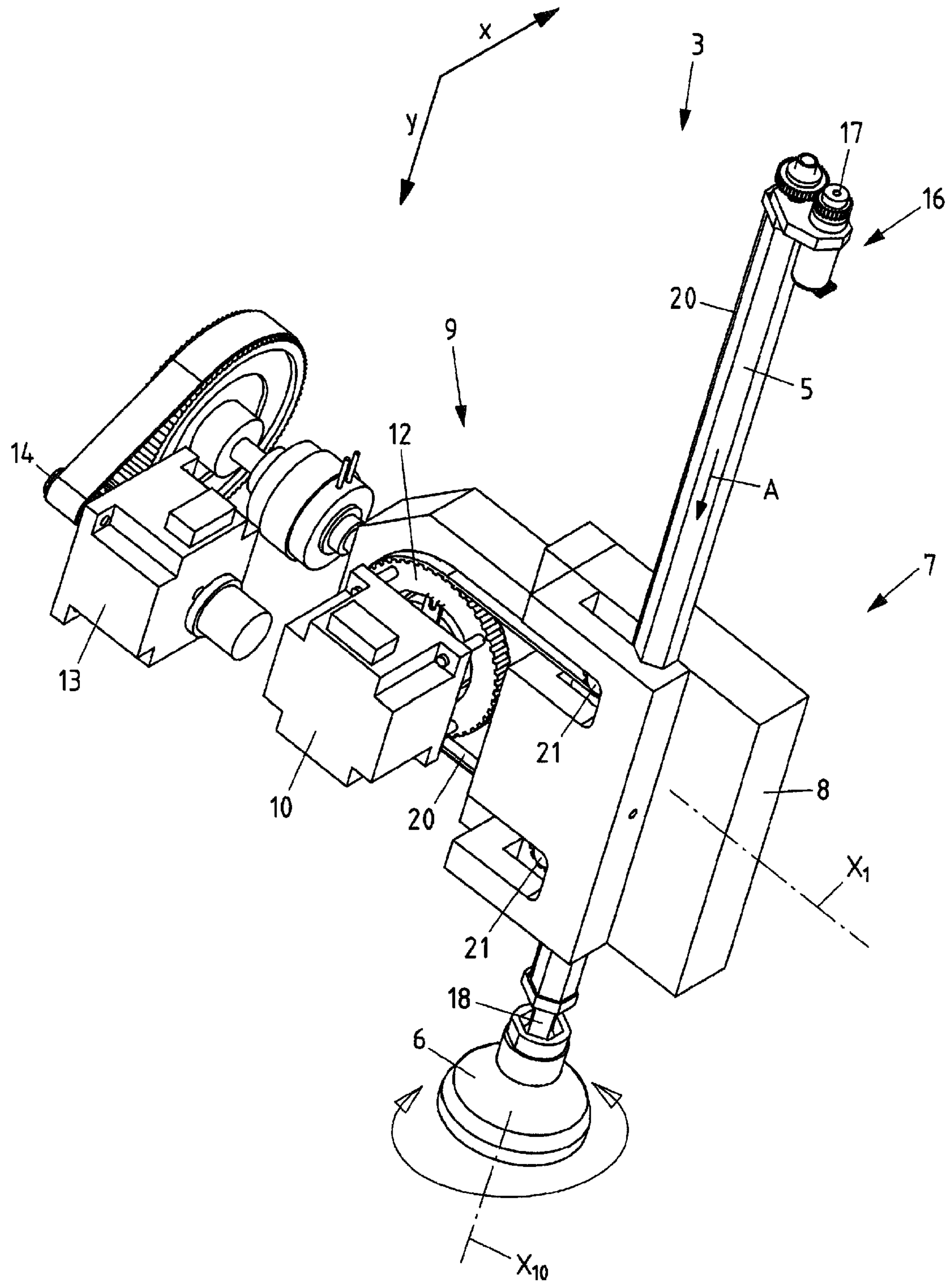
Figure 3A:
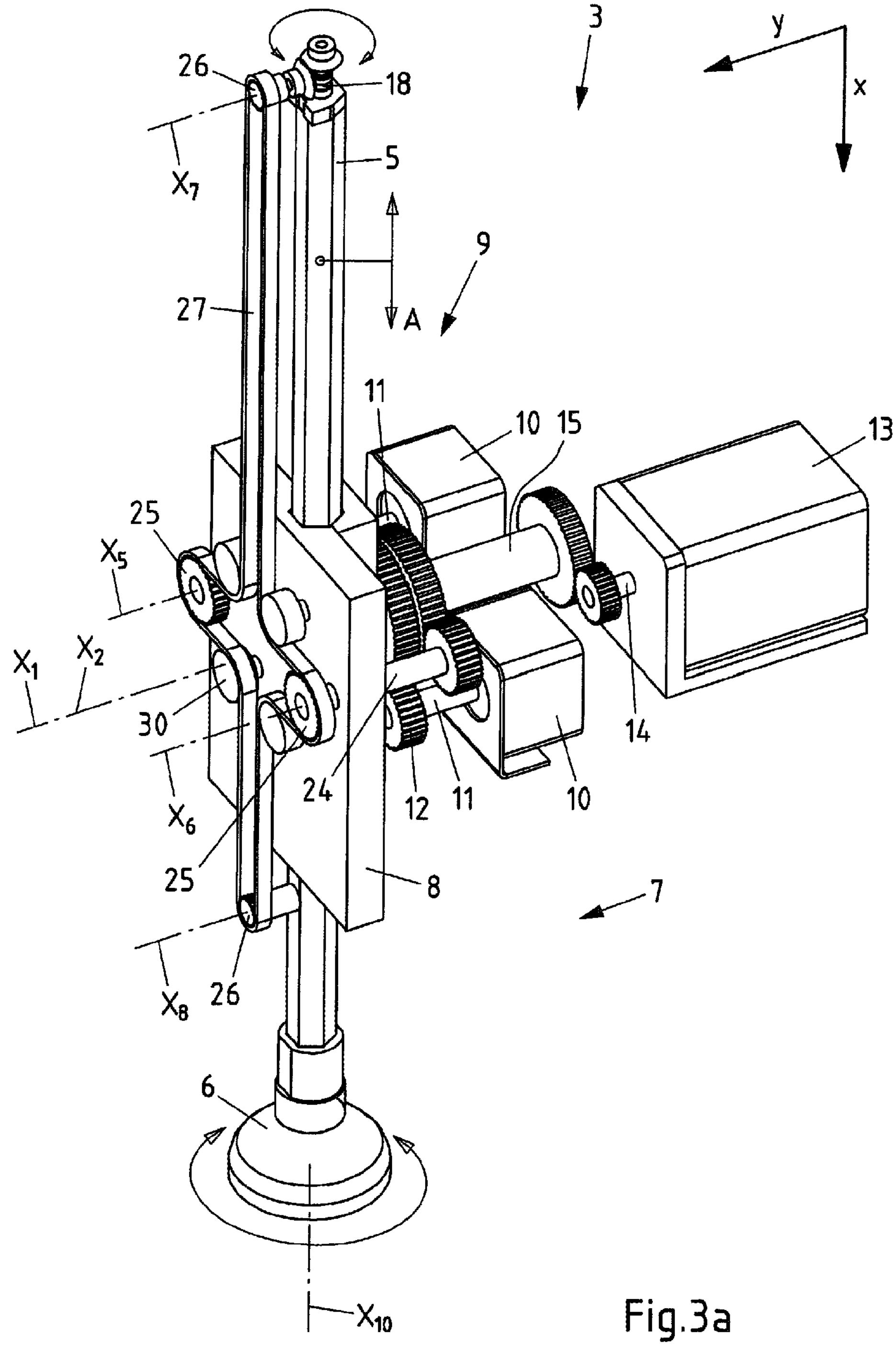
Figure 3B:
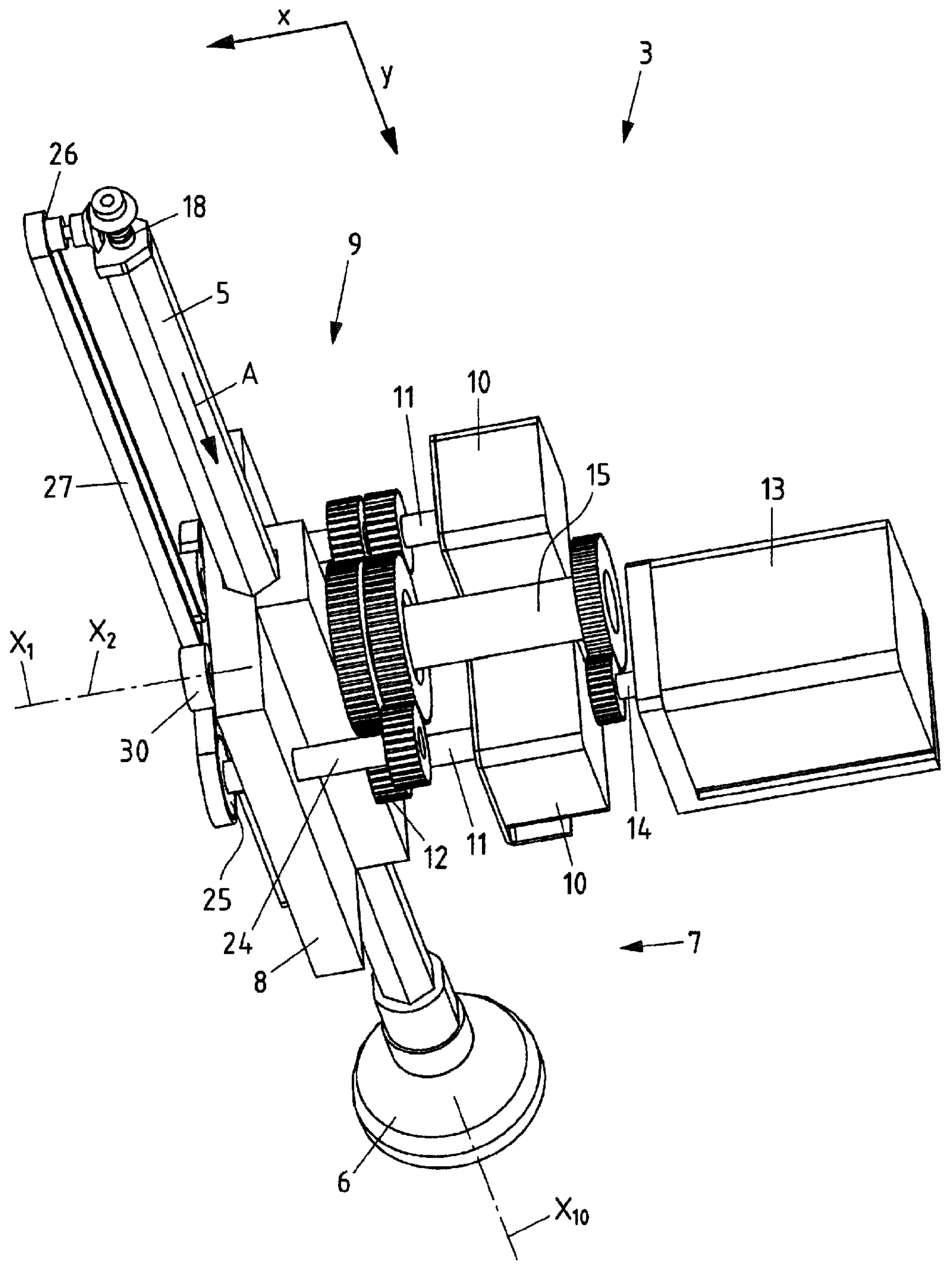
Figure 3C:
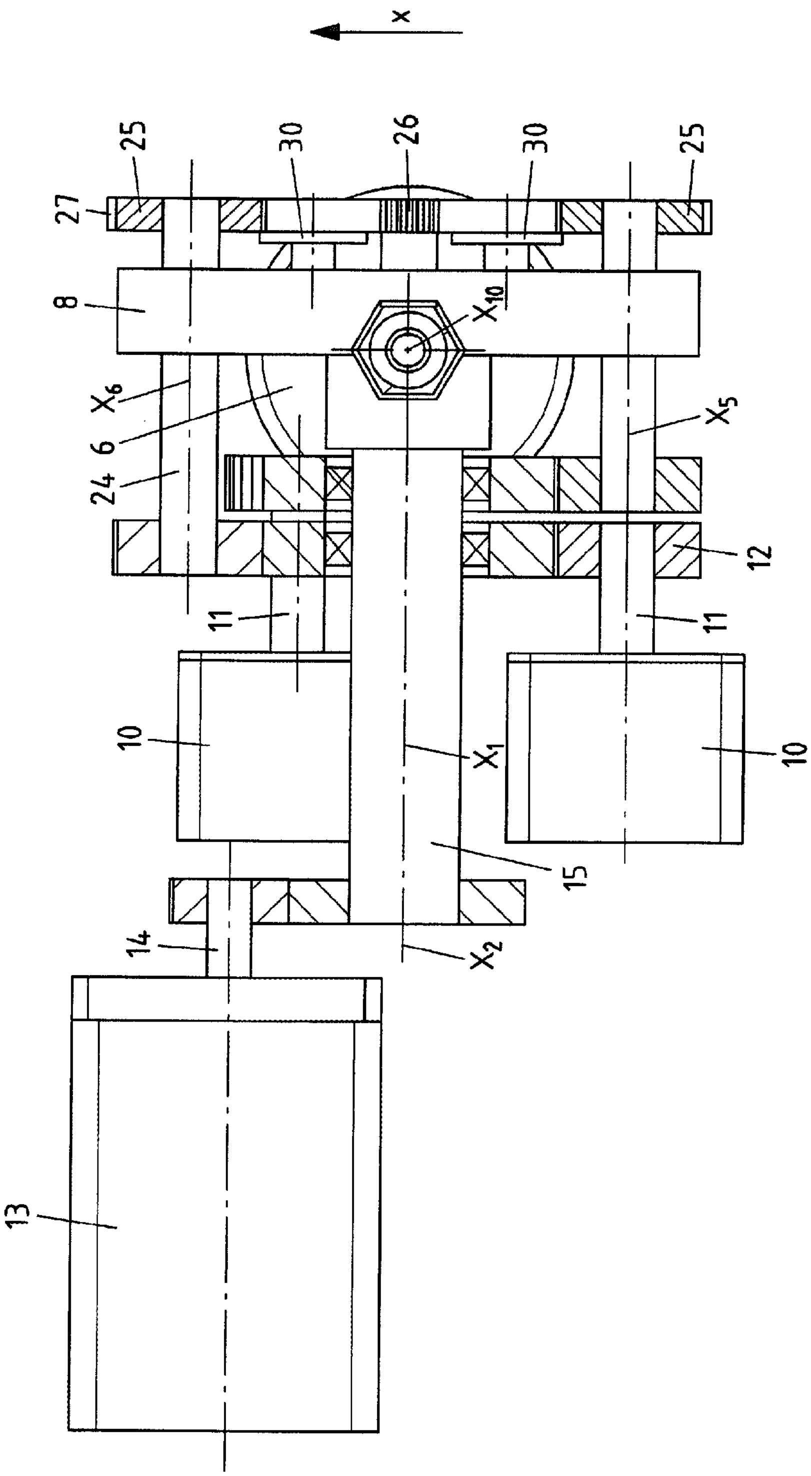
Figure 4B:
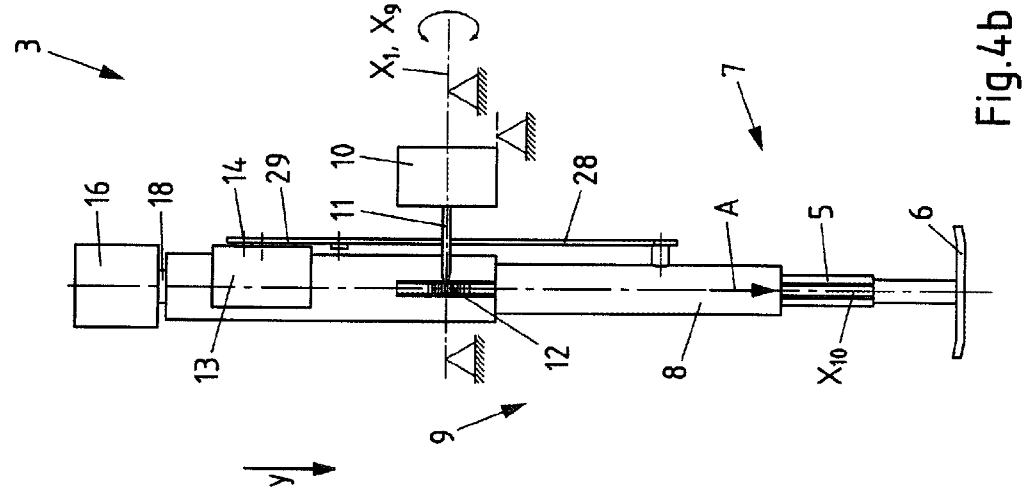
Figure 4A:
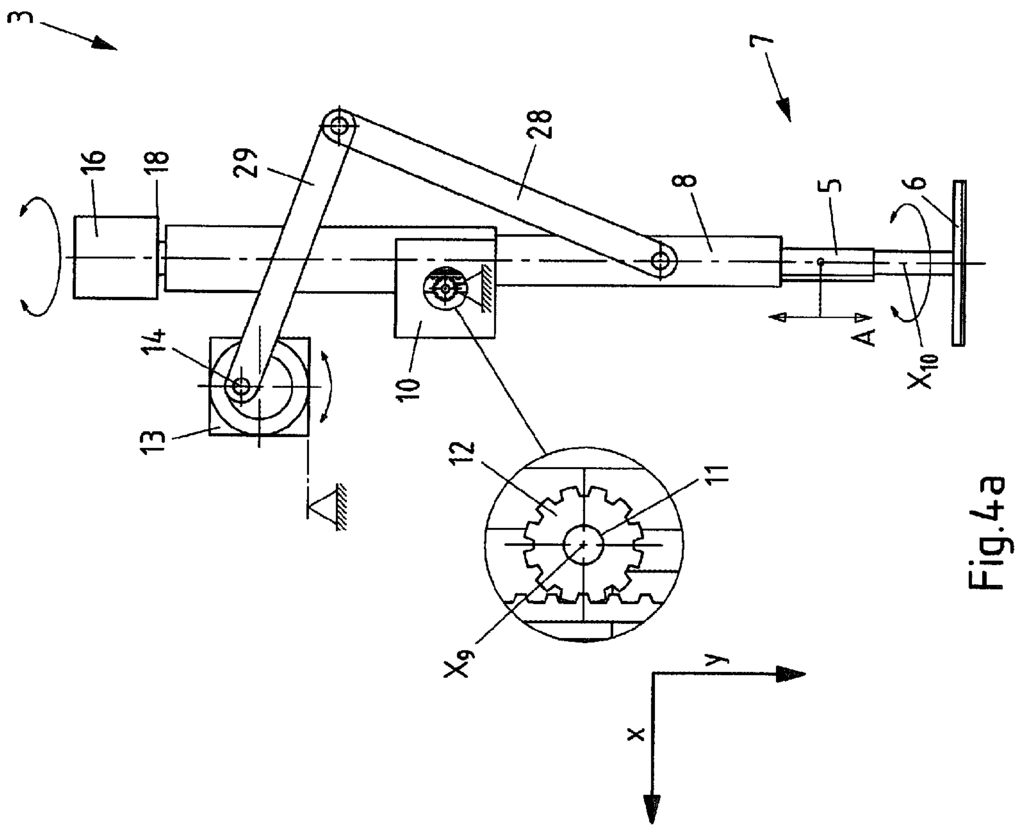

There is a multiplicity of possibilities for refining and developing the apparatus according to the invention and the method according to the invention. In this regard, reference should firstly be made to the patent claims following patent claim 1 and secondly to the description of exemplary embodiments in conjunction with the drawing. In the drawing:

FIGS. 1*a*) and *b*) show various views of an apparatus according to the invention with a cable drive, FIG. 2 shows a view of an apparatus according to the invention with a toothed belt drive, FIGS. 3*a*) to *c*) show various views of an apparatus according to the invention with parallel shafts and a toothed belt drive, and FIGS. 4*a*) and *b*) show various views of an apparatus according to the invention with a toothed rack drive.

All of the apparatuses illustrated in FIGS. 1*a*) to 4*b*) are based on the same operating principle. All of the apparatuses here are, by way of example, what is referred to as a blowing oscillating punch, that is to say an apparatus which, as manipulator means for a label 4, has an oscillating punch 7 which, via a punch foot designed as a suction and blowing head, conveys the sucked-up label 4, by combining axial movements and pivoting movements, from a pickup position to a deposit position and, at the deposit position, transfers the label 4 to a package 1 by a blast of compressed air brought about by the blowing head (what is referred to as blowing off). In principle, however, it is also conceivable to transfer the label 4 with the apparatuses described here to the package 1 in a touching manner, wherein then there is no blast of compressed air, but rather the punch foot 6 comes directly into contact with the package 1.

All of the apparatuses illustrated are apparatuses for labeling individual packages 1, with an advancing device 2 for transporting the respective package 1 in a transport direction X, with an application device 3 for applying a dispensed label 4 to the respective package 1, wherein the application device 3 has an oscillating punch 7, which has a punch stem 5 and a punch foot 6 connected thereto, for moving the dispensed label 4 from a pickup position, in which the label 4 is picked up by the punch foot 6, to a deposit position, in which the label 4 can be applied by the punch foot 6 to the respective package, wherein the application device 3 furthermore has a guide element 8, on which or in which the punch stem 5 is axially movable, and a holder 9, by which the punch stem 5 is held in the direction of gravitational force Y, and wherein the punch stem 5 is mounted pivotably about a horizontal pivot axis $X_1$ running orthogonally with respect to the direction of gravitational force Y and transport direction X, wherein the guide element 8 carries at least one of a plurality of components of the holder 9 and is pivotable about the pivot axis $X_1$.

Four different exemplary embodiments of an apparatus according to the invention will now be described in detail below by way of example:

The apparatus shown in FIGS. 1*a*) and *b*) has a cable drive, but basically can also have a belt drive, for example a toothed belt drive, instead of the cable drive. Furthermore, the apparatus has a punch stem 5 which is mounted in a guide element 8 and has a punch foot 6 at its lower end. The guide element 8 is designed here as a bearing plate, i.e. substantially in a plate-like manner. As the arrows at the punch foot 6 show, the punch foot 6 is rotatable about an axis of rotation $X_{10}$. For this purpose, the punch foot 6 is connected to a connecting shaft 18 for rotation therewith, the latter being mounted in the punch stem 5 exclusively rotatably and not movable in a translatory manner. The punch stem 5 can be moved downward in the axial direction A and upward counter to the axial direction A, wherein said punch stem is then guided laterally in the guide element 8. The guide element 8 can be moved about a pivot axis $X_1$ in a first pivoting direction $S_1$ and in opposed manner thereto in a second pivoting direction $S_2$, which results in an oscillating movement, wherein the punch stem 5 follows said oscillating movement by being guided laterally in the guide element 8.

The punch stem 5 is also held or fixed in the guide element 8 in every position relative to the guide element 8, which is brought about with a multi-part holder 9. The holder 9 comprises a cable 19, one end of which is fixedly connected to the upper end of the punch stem 5 and the other end of which is fixedly connected to the lower end of the punch stem 5. In addition, the holder 9 has two deflecting pulleys 21 which are carried by the guide element 8, and also a first drive motor 10 with a motor shaft 11 and a drive wheel 12 arranged on the latter for rotation therewith, and furthermore a further deflecting pulley 23. The cable 19 is tautly tensioned and, starting from the upper end, is deflected with respect to the upper of the two deflecting pulleys 21 connected to the guide element 8 by 90° transversely with respect to the pivoting directions $S_1$ and $S_2$, is then guided over the further course around the drive wheel 12, is then deflected again at the further deflecting pulley 23 and finally is deflected once again at the second of the two deflecting pulleys 21, which are connected rotatably to the guide element 8. The deflecting pulleys 21 and 23 and the drive wheel 12 each have a circumferentially encircling groove 22 which laterally guides the cable 19.

The cable 19 is guided in the region between the deflecting pulleys 21 and the drive wheel 12 by a first connecting shaft 15 which is a hollow shaft, wherein that portion of the cable 19 which leads from the upper of the two deflecting pulleys 21 to the drive wheel 12, and the portion which leads from the drive wheel 12 or the deflecting pulley 23 to the lower of the two deflecting pulleys 21, run parallel to each other in the connecting shaft 15.

The connecting shaft 15 is connected to the guide element 8 for rotation therewith and is driven by a second drive motor 13 with a motor shaft 14.

In addition, a third drive motor 16 with a motor shaft 17 is also provided, said third drive motor driving the second connecting shaft 18, which is connected to the punch foot 6 for rotation therewith.

In order now to bring about a pivoting movement in the pivoting directions $S_1$ and $S_2$, the second drive motor 13 is activated and rotates the first connecting shaft 15 about its longitudinal center axis, which is at the same time the pivot axis $X_1$. The rotational movement is transmitted to the guide element 8 which in turn transmits this movement to the punch stem 5.

A movement of the punch stem 5 in and counter to the axial direction A is brought about by the first drive motor 10 which can move the cable 19 to and fro. The movements of the cable 19 are transmitted to the punch stem 5 via the connection of the cable 19 thereto.

In this exemplary embodiment, the first drive motor 10 and the second drive motor 13 are not connected to the guide element 8 or to the punch stem 5, but rather are positionally fixed in a labeler (not illustrated for clarity reasons) and are immovable relative thereto.

FIG. 2 shows an exemplary embodiment of an apparatus according to the invention with a toothed belt drive. The basic manner of operation is the same as in the case of the previously described exemplary embodiment, wherein use is made here instead of a cable 19 of a belt 20 in the form of a toothed belt. A drive wheel 12 of a first drive motor 10 and at least two deflecting pulleys 21 are also provided here, but the drive wheel 12 and the deflecting pulleys 21 here being designed as gear wheels.

A further difference here is that, in comparison to the previously described exemplary embodiment, the positions of the first drive motor 10 and of the second drive motor 13 are swapped, that is to say, in this case, the first drive motor 10 lies between the second drive motor 13 and the punch stem 5. The first drive motor 10 is fastened here to the guide element 8 and follows the pivoting movements (the oscillating movement) of the guide element 8. Since, in comparison to the previous exemplary embodiment, the position between first drive motor 10 and second drive motor 13 has been swapped, the toothed belt in this case does not have to be guided by a hollow shaft between drive wheel 12 and deflecting pulleys 21.

FIGS. 3*a*) to *c*) illustrate an exemplary embodiment of an apparatus according to the invention with multi-purpose shafts (parallel shafts) and a toothed belt drive. Here too, the punch stem 5 is basically movable axially within the guide element 8, the guide element 8 is pivotable together with the punch stem 5 about a pivot axis $X_1$, and the punch foot 6 is rotatable about an axis of rotation $X_{10}$ by a second connecting shaft 18, which is guided in the interior of the punch stem 5.

The pivoting movement in the pivoting directions $S_1$ and $S_2$ is also brought about here by a second drive motor 13 with a motor shaft 14 by the drive motor 13 driving a first connecting shaft 15, which is connected to the guide element 8 for rotation therewith.

Running parallel to the first connecting shaft 15 are two multi-purpose shafts 24 which extend through the guide element 8 and are mounted rotatably therein. Each of the two multi-purpose shafts 24 is driven by a dedicated first drive motor 10 with a motor shaft 11. In this case, there is therefore not simply provision of an individual first drive motor, but rather of two first drive motors 10 which together form a drive, via which, as described below, not only is the axial movement of the punch stem 5 within the guide element 8 and relative to the advancing device 2 realized, but additionally also the rotational movement of the punch foot 6 or of the connecting shaft 18, which is connected thereto for rotation therewith and runs in the interior of the punch stem 5.

On that side of the guide element 8 which faces away from the drive motors 10 and 13, the multi-purpose shafts 24 each have a drive wheel 25 which is connected to the respective end of the multi-purpose shaft 24 for rotation therewith. Furthermore, a deflecting pulley 26 is in each case arranged on an upper portion of the punch stem 5 that, in each position of the punch stem 5 relative to the guide element 8, is arranged vertically above the guide element 8, and on a lower portion of the punch stem 5 that, in each position of the punch stem 5 relative to the guide element 8, is arranged vertically below the guide element 8. The axes of rotation $X_5$, $X_6$, $X_7$ and $X_8$ of the two drive wheels 25 and of the two deflecting pulleys 26 run parallel to each other and orthogonally with respect to the axial direction A of the punch stem 5.

An endless belt 27 is guided via the two drive wheels 25 and is thereby driven. The endless belt 27 is guided here via deflecting pulleys 30, which are carried by the guide element 8, and the deflecting pulleys 26, which are carried by the punch stem 5. The endless belt 27 here is a toothed belt, and the drive wheels 25 and the deflecting pulleys 26 and 30 are each formed here by a gear wheel.

Of the deflecting pulleys 26, a deflecting pulley is connected rotatably at the upper end to the punch stem 5. Another of the deflecting pulleys 26 is connected rotatably to the punch stem 5 below the guide element 8, and therefore the guide element 8 runs between the two deflecting pulleys 26. The upper of the deflecting pulleys 26 is coupled here to the second connecting shaft 18 and drives the latter.

The endless belt 27 connects the drive wheels 25 and the deflecting pulleys 26 and 30 to one another in such a manner that, when the two first drive motors 10 are operated in opposite directions such that the two motor shafts 11 rotate in an opposed manner with respect to each other, the punch stem 5 is thereby moved axially relative to the guide element 8. If, by contrast, the two first drive motors 10 and motor shafts 11 rotate in the same direction, the punch foot 6 is thereby set into rotation via the second connecting shaft 18. In this manner, the two first drive motors 10 form a drive which takes on the function of a first and third drive motor as previously described. A separate third drive motor for bringing about the rotation of the punch foot 6 is thereby not necessary.

FIGS. 4*a*) and *b*) finally show an exemplary embodiment of an apparatus according to the invention with a toothed rack drive.

The punch stem 5 is designed here as a toothed rack on which a drive wheel 12 in the form of a gear wheel acts, said drive wheel being connected to the motor shaft 11 of a first drive motor 10 for rotation with said motor shaft. By actuation of the first drive motor 10, the toothed rack or the punch stem 5 is moved axially. As mentioned, said first drive motor 10 can alternatively also use the gear wheel 12 to drive a toothed belt 20 and, via the latter, the punch stem 5.

A second drive motor 13 is designed as an eccentric drive and has a motor shaft 14 in the form of a crankshaft. The eccentric driving movement of the second drive motor 13 is transmitted via a second connecting rod 29 to a first connecting rod 28 and from the latter to the guide element 8. When the second drive motor 13 is actuated, the guide element 8 together with the punch stem 5 guided therein and the first drive motor 10 connected thereto is correspondingly pivoted to and fro about the motor shaft 11 or the center axis thereof.

Finally, a third drive motor 16 is connected at the upper end to the punch stem 5. The punch stem 5 is also hollow here, and a second connecting shaft 18 is guided in its interior. The third drive motor 16 uses a motor shaft 17 to drive the second connecting shaft 18, which is connected to the punch foot 6 for rotation therewith. A rotational movement of the punch foot 6 is thereby then also possible.

The invention claimed is:

1. An apparatus for labeling a package, the apparatus comprising:

an advancing device for transporting the package in a transport direction, and an application device for applying a dispensed label to the package, wherein the application device has an oscillating punch having a punch stem and a punch foot connected to the punch stem, wherein the oscillating punch is configured to move the dispensed label from a pickup position, in which the dispensed label is picked up by the punch foot, to a deposit position, in which the dispensed label is applied by the punch foot to the package, wherein the application device further comprises a guide element on which the punch stem is mounted axially movably and which guides the punch stem during axial movements of the punch stem, wherein the application device further comprises a holder consisting of a unit formed of a plurality of components, and wherein the holder holds the punch stem in a direction of gravitational force in each position of the punch stem relative to the guide element, wherein one of the plurality of components of the holder is a first drive motor having a motor shaft that is at least configured to cause the axial movements of the punch stem, wherein the punch stem is mounted pivotably about a horizontal pivot axis running orthogonally with respect to the direction of gravitational force, wherein the guide element carries at least one of the plurality of components of the holder and is pivotable on a carrier to which the guide element is mounted about the horizontal pivot axis, and wherein the first drive motor is immovable relative to the carrier and/or relative to the advancing device.

2. The apparatus as claimed in claim 1, wherein the guide element and the at least one of the plurality of components of the holder carried by the guide unit form a unit which is movable only in a rotatory and not translatory manner relative to the carrier to which the guide element is mounted and/or relative to the advancing device.

3. The apparatus as claimed in claim 1, wherein the first drive motor is connected to one of the plurality of components of the holder, said one of the plurality of components not being carried by the guide element, wherein the component is a drive wheel.

4. The apparatus as claimed in claim 1, wherein the guide element is coupled to a second drive motor.

5. The apparatus as claimed in claim 4, wherein the second drive motor is coupled to a first connecting shaft, which is connected to the connecting element for rotation with the connecting element.

6. The apparatus as claimed in claim 1, wherein the punch foot is coupled to a third drive motor.

7. The apparatus as claimed in claim 6, wherein the third drive motor is coupled to a second connecting shaft, which is connected to the punch foot for rotation with the punch foot.

8. The apparatus as claimed in claim 7, wherein the second connecting shaft) runs within the punch stem and is rotatable with respect to the punch stem.

9. The apparatus as claimed in claim 3, wherein the holder has a cable or a belt, which is connected with a first portion to an upper portion of the punch stem such that, in each position of the punch stem relative to the guide element, the first portion of the cable or belt is arranged vertically above the guide element and is connected with a second portion to a lower portion of the punch stem such that, in each position of the punch stem relative to the guide element, the second portion of the cable or belt is arranged vertically below the guide element.

10. The apparatus as claimed in claim 9, wherein the guide element carries at least two of the plurality of components of the holder, wherein said at least two of the plurality of components of the holder are two deflecting pulleys, wherein the cable or the belt, starting from the first portion or the second portion is deflected on one of the two deflecting pulleys, then guided circumferentially about the drive wheel driven by the first drive motor and, then is deflected on another of the two deflecting pulleys.

11. The apparatus as claimed in claim 10, wherein the cable or the belt, in a region between the drive wheel driven by the first drive motor and the guide element is:

deflected on a further deflecting pulley, which is not carried by the guide element, and/or guided by a first connecting shaft, which is connected to the connecting element, and which is configured as a hollow shaft.

12. The apparatus as claimed in claim 11, wherein an axis of rotation of the first connecting shaft is orthogonal to axes of rotation of the two deflecting pulleys carried by the guide element.

13. The apparatus as claimed in claim 4, wherein the at least one first and/or the second drive motor are/is immovable relative to the carrier to which the guide element is mounted and/or relative to the advancing device.

14. The apparatus as claimed in claim 9, wherein the first drive motor is connected directly or indirectly to the guide element and is mounted immovably relative thereto.

15. The apparatus as claimed in claim 6, wherein the third drive motor is directly or indirectly connected to the punch stem and is mounted immovably relative thereto.

16. The apparatus as claimed in claim 10, wherein the holder has a belt, wherein the belt is a toothed belt, and wherein the drive wheel, which is driven by the first drive motor, and/or the two deflecting pulleys are each in a form of a gear wheel.

17. The apparatus as claimed in claim 1, wherein the guide element carries at least two of the plurality of components of the holder, wherein said at least two if the plurality of components carried by the guide element are in a form of two parallel multi-purpose shafts which are both connected rotatably to the guide element, wherein the holder further comprises a second first drive motor, and wherein each of the two multi-purpose shafts is separately driven by one of the two first drive motors.

18. The apparatus as claimed in claim 17, wherein each of the multi-purpose shafts has a drive wheel connected thereto for rotation therewith, and wherein an upper deflecting pulley of two deflecting pulleys is arranged on an upper portion of the punch stem such that, in each position of the punch stem relative to the guide element, the upper deflecting pulley is arranged vertically above the guide element, and a lower deflecting pully of the two deflecting pulleys is arranged on a lower portion of the punch stem such that, in each position of the punch stem relative to the guide element, the lower deflecting pulley is arranged vertically below the guide element, wherein axes of rotation of the two drive wheels and of the two deflecting pulleys run parallel to one another and orthogonally with respect to an axial direction of the punch stem, and wherein an endless belt is guided via the two drive wheels and the two deflecting pulleys.

19. The apparatus as claimed in claim 18, wherein the upper and/or the lower deflecting pulley is coupled to a second connecting shaft, which is coupled to the punch foot for rotation therewith.

20. The apparatus as claimed in claim 19, wherein an opposed rotational movement of the two drive wheels brings about translatory movement of the punch stem in the axial direction and a parallel rotational movement of the two drive wheels brings about rotational movement of the second connecting shaft and of the punch foot which is connected thereto for rotation therewith.

21. The apparatus as claimed in claim 17, wherein the two first drive motors are connected directly or indirectly to the guide element and are mounted immovably relative thereto, and/or the second drive motor is immovable relative to a carrier, relative to which the guide element is mounted and/or relative to the advancing device.

22. The apparatus as claimed in claim 18, wherein the endless belt is a toothed belt, and the drive wheels and the deflecting pulleys are each in a form of a gear wheel.

23. The apparatus as claimed in claim 1, wherein the punch stem is configured as a toothed rack.

24. The apparatus as claimed in claim 23, wherein the first drive motor drives a gear wheel which is in engagement with the toothed rack.

25. The apparatus as claimed in claim 4, wherein the guide element carries at least one first connecting rod which is articulated thereon, and the second drive motor exerts an eccentric movement on a second connecting rod which is connected in an articulated manner to the first connecting rod.

26. The apparatus as claimed in claim 23, wherein the first drive motor is immovable relative to a carrier, to which the guide element is mounted and/or relative to the advancing device and/or relative to the guide element.

27. The apparatus as claimed in claim 23, wherein the guide element and/or the punch stem is pivotable about a drive axis of the first drive motor.

28. The apparatus as claimed in claim 1, wherein a clutch is provided between the first drive motor and the punch stem.

29. A method for labeling a package using an apparatus as claimed in claim 1, wherein, in order to apply the dispensed label, the punch foot is moved from the pickup position directly in a direction which runs at an angle to the transport direction, and after the dispensed label has been applied to the package in the deposit position, the punch foot is moved back to the pickup position, wherein, during the movement from the pickup position to the deposit position, the guide element together with the punch stem is pivoted about a pivot axis in a first pivoting direction, and the punch stem is moved relative to the guide element in a first movement direction, and, during the movement from the deposit position to the pickup position, the guide element together with the punch stem is pivoted about the pivot axis in a second pivoting direction and the punch stem is moved relative to the guide element counter to the first movement direction in such a manner that the punch foot, during its entire movement from the pickup position to the deposit position and back again to the pickup position, is guided along a revolving path which does not come into contact or cross itself at any point.

* * * * *